United States Patent [19]
Kay et al.

[11] 4,456,033
[45] Jun. 26, 1984

[54] PERFORATED SHEET STOCK FLOW RESTRICTOR

[75] Inventors: George Kay, Anaheim; Alan Keskinen, Van Nuys, both of Calif.

[73] Assignee: Vacco Industries, South El Monte, Calif.

[21] Appl. No.: 310,098

[22] Filed: Oct. 9, 1981

[51] Int. Cl.³ ............................................... F15D 1/02
[52] U.S. Cl. ........................................ 138/42; 137/14
[58] Field of Search ................ 137/625.3, 625.37, 14; 138/38, 42, 37, 40, 41, 43; 251/127; 181/268

[56] References Cited

U.S. PATENT DOCUMENTS

| | | | |
|---|---|---|---|
| 3,513,864 | 5/1970 | Self | 138/42 X |
| 3,529,628 | 9/1970 | Cummins | 137/625.3 |
| 3,722,854 | 3/1973 | Parola | 138/42 X |
| 3,856,049 | 12/1974 | Scull | 138/42 |
| 3,899,001 | 8/1975 | Orme | 138/42 X |
| 4,007,908 | 2/1977 | Smagghe et al. | 251/127 |
| 4,008,737 | 2/1977 | Kluczynski et al. | 251/127 X |
| 4,018,245 | 4/1977 | Baumann | 138/42 X |
| 4,068,683 | 1/1978 | Self | 251/127 X |
| 4,125,129 | 11/1978 | Baumann | 137/625.37 X |

Primary Examiner—Stephen Marcus
Assistant Examiner—Mark Thronson
Attorney, Agent, or Firm—Frederick E. Mueller

[57] ABSTRACT

A flow restrictor to minimize noise and cavitation, or other adverse effects, in regulating the flow of a high pressure fluid. The restrictor defines a myriad of tortuous, dissimilar, intertwined, and commingled energy dissipating chambered flow paths edgewise through a stack of sheets of perforated stock material. Adjacent sheets have their perforations out of registration with one another, the inlet and outlet to the restrictor being edgewise through the stack through open-sided ones of the perforations of the several sheets of stock.

13 Claims, 7 Drawing Figures

PERFORATED SHEET STOCK FLOW RESTRICTOR

BACKGROUND OF THE INVENTION

1. Field of the Invention

This invention relates generally to the art of regulating the flow of high pressure liquids or gasses and, more particularly, to an improved flow restrictor, such as a valve, for conducting a pressurized fluid relatively noiselessly and without detrimental fluid cavitation due to normal orificial throttling through a substantial pressure drop.

2. Prior Art

A wide variety of fluid sound suppressors have heretofore been devised. In one approach, there are devices involving the use of a stack of solid discs, adjacent abutting pairs of which define tortuous, sometimes chambered passages formed therebetween and extending between inlet and outlet edges. Self U.S. Pat. No. 3,514,074 and Scull U.S. Pat. No. 3,856,049 typify this approach.

In another approach, sets of perforated discs are disposed between solid discs, the resulting stack defining tortuous individual passages edgewise through the stack by means of the overlapping relationship of the disc perforations. Such devices are shown in Self U.S. Pat. No. 3,512,864, Orme U.S. Pat. No. 3,899,001, Kluczynski U.S. Pat. No. 3,941,350 and Vick U.S. Pat. No. 3,978,891.

There are also flow restrictors in which long lengths of woven screen material, or ribbons of perforated sheets, are wound into coils on a supporting surface to usually define radial flow through the pores of successive layers of the coiled material. Variations of this approach are shown in Souriau U.S. Pat. No. 3,574,310, Parola U.S. Pat. No. 3,722,854 and White U.S. Pat. No. 3,802,537.

These prior art devices are relatively expensive or difficult to manufacture, or both. In the case of the disc stacks, the discs typically are custom made by expensive processes, are not uniform in surface configuration or geometry, and must be carefully assembled in precise order with particular care to circularly orient one disc relative to another to define the individual passageways therethrough. In the case of the coiled types, it is particularly cumbersome to wind the material into coil form with any kind of precision as to the integrity of the faying contact of successive layers and of the extent of overlap of perforations to attain a desired porosity or distribution of porosity radially through the coil.

SUMMARY OF THE INVENTION

This invention provides an improved sound and erosion suppressing device of the class described which can be economically mass produced in a wide variety of standard or non-standard models to be compatible with all kinds of compressible or non-compressible fluids for service under ordinary or extreme conditions.

To this end, the invention provides a sound suppressing flow restrictor in the form of a stack of eccentrically related sheets of perforated sheet stock material. Opposite edges of the stack include open-sided ones of the perforations to define edgewise flow into and out of the stack. Opposite sides, such as the top and bottom of the stack, are closed by solid plates whereby flow of the fluid between the inlet and outlet edges is confined to the interstices defined between the overlapping perforations of adjacent sheets of the stock material. The staggered or eccentric relationship of the perforated sheet material is such as to define a vast plurality of cells in overlapping fluid communication with one another, both in the direction of overall flow from inlet to outlet and laterally, as well. This staggered or eccentric relationship between the perforated sheet material also defines a wide variety of orificial shapes of interstices intercommunicating the defined cells. The net result, internally of the stack, is a myriad of non-uniform, intertwined, commingled, tortuous chambered fluid flow paths, which dissipate energy and avoid cavitation while the fluid undergoes a substantial pressure drop therethrough to exit at a substantially uniform velocity.

The flow restrictor may be formed or fabricated in various ways according to the invention. Prefabricated, non-woven, perforated sheet stock is available in a wide variety of styles. Typically, the material is rolled sheet metal, e.g., 1/16 to ⅛ inch thickness, that is perforated, along two or more axes, with a plurality of equally spaced apart perforations to achieve a desired ratio of open or perforated area relative to web area. Round, hexagonal, square, slotted or rectangular holes, or other configurations, may be employed, in a side-staggered or end-staggered, or linear relationships, and the holes may be formed with a taper. Preferably, a plurality of identical such sheets are punched, or otherwise cut out, to the same planform, e.g., annular, leaving open cells at opposite sides, and then concentrically stacked together around a perforated inlet sleeve. The annular sheets may be divided into two sets of like number with all of the sheets of one set mounted with their perforations in registration with one another but eccentrically overlapping the perforations of the other set.

In a typical preferred embodiment, sheets on the order of 1/16 inch in thickness of a staggered hexagonal perforated pattern are employed, the web or bars being on the order of 1/32 inch wide and spaced about ¼ inch center to center. Eight such sheets of annular planform are assembled in two concentric sets of four sheets, the sheets of each set having their cell-defining perforations in registration with one another but out of registration with the cell-defining perforations of the other set. The two sets, or multiples thereof, are then assembled between a pair of concentric annular solid plates around a central perforated inlet sleeve. Preferably, solid annular barrier plates separate adjacent tiers of the pairs of perforated sets to define separate strata of generally radial flow of the fluid, depending on the position of a poppet within the inlet sleeve.

DESCRIPTION OF THE PREFERRED EMBODIMENT

Figure 1:
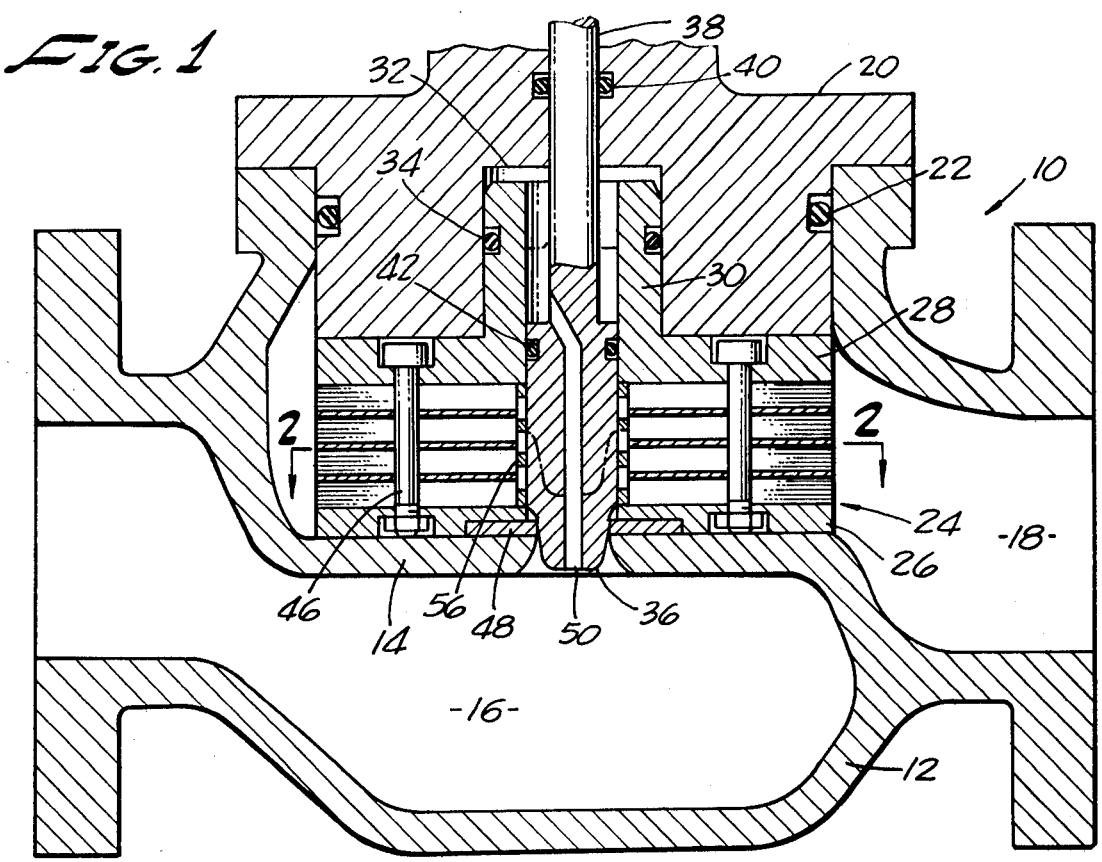
FIG. 1 is a longitudinal section through a sound suppressing fluid handling device, in this instance a valve, according to the invention.

FIG. 1 schematically shows a typical high pressure fluid control valve 10. The valve has a hollow body 12 that is internally formed with a web 14 defining an inlet chamber 16 and an outlet chamber 18 within the body. The valve body and its outlet chamber 18 are closed at the top by a bonnet 20, fitted with appropriate seal means 22. It will, of course, be understood that the bonnet is secured to the valve body by appropriate fastening means, such as bolts (not shown).

In normal use of the valve, the inlet 16 receives a relatively high pressure fluid and the outlet 18 communicates to a relatively low pressure region such that the fluid undergoes a substantial pressure drop within the valve. During passage of the fluid through such pressure drop, it normally tends to generate substantial noise due to cavitation and other causes. The present invention suppresses or attenuates and thereby substantially reduces or eliminates such noise.

To this end, there is positioned within the valve body 12 a fluid energy dissipating or sound suppressing means 24 for conducting the incoming high pressure fluid relatively noiselessly through its pressure drop. The suppressor means 24, as will be described in detail below, defines a myriad of non-uniform, intertwining, commingled, tortuous, chambered fluid flow paths, which dissipate energy and avoid cavitation while the fluid undergoes a substantial pressure drop therethrough to exit at a substantially uniform velocity.

The suppressor means 24 may, if desired, be incorporated as one element of a replaceable cartridge for the valve 10. Thus, in the illustrated embodiment, the suppressor means 24 is confined between a rigid annular bottom plate 26 and a rigid annular top plate 28. The top plate 28 may be integrally formed with an upstanding cylindrical boss 30 adapted to be coaxially slideably received within a corresponding counterbore 32 formed in the valve bonnet 20. A suitable seal ring 34 is provided between the boss 30 and the wall of the counterbore 32.

This cylindrical boss 30 provides a clearance and guide for reciprocation of a poppet valve 36 having a reduced diameter operating stem portion 38 extending through an opening in the valve bonnet 20. An appropriate seal means 40 is provided for the stem of the poppet and, similarly, another seal means 42 is provided on the body of the poppet, in sliding relation to the inner wall of the boss 30.

The suppressor means 24 is sandwiched between the top plate 28 and lower plate 26. This cartridge structure may be held in assembled relationship by any suitable fastening means, for example, by a circularly spaced apart plurality of nut and bolt fastener means 46 having opposite ends seated in the plates 26 and 28. As shown, the lower face of the bottom plate 26 may be provided with a central circular depression defining a shoulder for mounting a replaceable poppet seat ring 48. The poppet nose may have a tapered seating surface and contoured angle end for flow control characteristics, if desired, and incorporates a central drill passage 50 from the inlet side to the top of the poppet for pressure balancing to minimize actuation loads.

Figure 2:
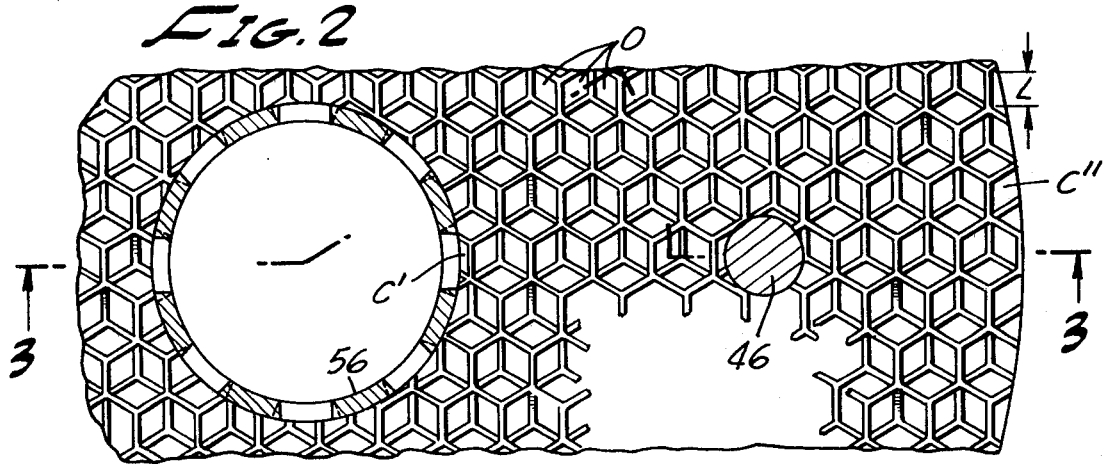
FIG. 2 is a fragmentary section through the sound suppressor means taken on the line 2—2 of FIG. 1, on a larger scale.
Figure 3:
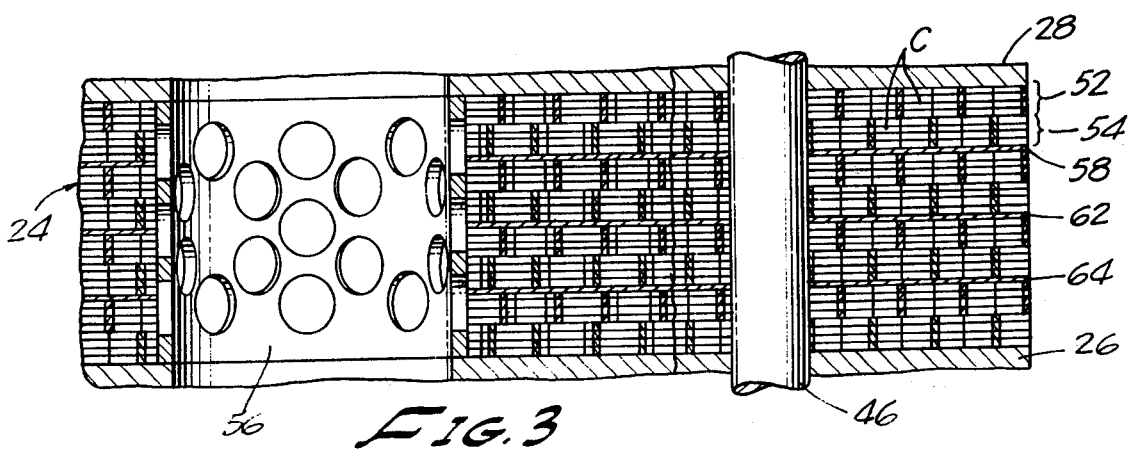
FIG. 3 is a radial section of the line 3—3 of FIG. 2.

Referring to FIGS. 2 and 3, the suppressor means 24 comprises at least one tier of two sets of perforated sheet stock 52 and 54. In the illustrated case, the suppressor means 24 is of annular configuration and is assembled around a coaxially mounted central inlet sleeve 56. In this embodiment, four tiers of suppressor means 24 are shown, isolated from one another by solid annular barrier plates 58, 62 and 64 and it is assumed that the flow of the fluid enters the perforated sleeve 56 and, depending on the position of the poppet 36, exits the sleeve radially outwardly in separate strata through the tiers 24, exiting edgewise into the low pressure chamber 18. As shown, the I.D., of the sleeve 56 is sized to coincide with that of the cylindrical boss 30 to also serve as a guide for the poppet 36.

The valve member is moveable from its solid line closed position on the seat 48, as shown in FIG. 1, to its broken line partially open position, or to any intermediate or further position to permit fluid flow through one or more of the tiers 24. During flow of the fluid through the means 24, the fluid energy is progressively dissipated to eliminate or suppress cavitation and noise.

Each set 52, 54 of perforated sheet stock comprises four sheets of a staggered hexagonal pattern, i.e., such that every bar defines a side in common of two adjacent hexagonal perforations. In the illustrated case, each set 52, 54 consists of four identical sheets, all four of which are assembled in registration of their bars and perforations to define hexagonal cells C in each set, each cell being bounded by the hexagonal defining bars of four sheets of stock. However, the two sets 52, 54 are assembled in a single stack in an eccentric relationship, i.e., such that the bars of one set are laterally offset in line with and the length L of one bar out of registration with the bars of the other set. As a result, the cells C of the two sets are in overlapping fluid communication. This eccentric relationship of the two sets 52, 54 also defines a number of orificial restrictions O. In the given case, as shown in FIG. 2, due to the lateral one bar offset, the orifices O appear as diamond shapes each defined by four bars of overlapping cells C, a given cell having communication with other cells C through three orifices C.

FIG. 3, in its radially outermost part beyond the fastener means 46, shows a section through suppressor means 24 along a radius that intercepts bars of hexagonal perforations at right angles and at regular intervals. Radially inwardly of the fastener means 46, the section is represented as taken along a radius that intercepts bars of the hexagonal cells at oblique angles and at irregular intervals. From comparison of the two sections (and from analysis of other radial lines which can be drawn on FIG. 2 at other oblique angles), it can be seen that a very great variety of radial flow paths that are different from one another are produced in any given quadrant of the annular suppressor means 24. It should also be observed that, although with the arrangement of FIG. 2 all of the orifices O have substantially the same diamond shape, that they have varying orientations relative to the generally radial outflow of the fluid therethrough. The net result internally of the stack, is a myriad of non-uniform, intertwined, commingled, tortuous, chambered fluid flow paths. However, at the same time, it will be observed that as all of these radial flow paths have lateral or circumferential intercommunication, since the fluid always seeks the path of least resistance the fluid exits the suppressor means 24 at a substantially uniform velocity, irrespective of circumferential position.

As has been noted, in FIG. 2 there is represented a relationship of the two sets 52, 54 of hexagonally perforated sheet stock such that the set 52 is offset relative to the set 54, e.g., the length L of one bar in a direction of a bar. A different relationship of the sets 52, 54, producing different arrays of orificial openings O is achieved if the set 52 is offset relative to the set 54 laterally in a direction ninety degrees relative to one of the bars with the offset distance amounting, e.g., to one-half of the center-to-center spacing between openings. Assuming an arcuate planform for the suppressor means, there will once again be a great variety of different radial flow paths.

Figure 4:
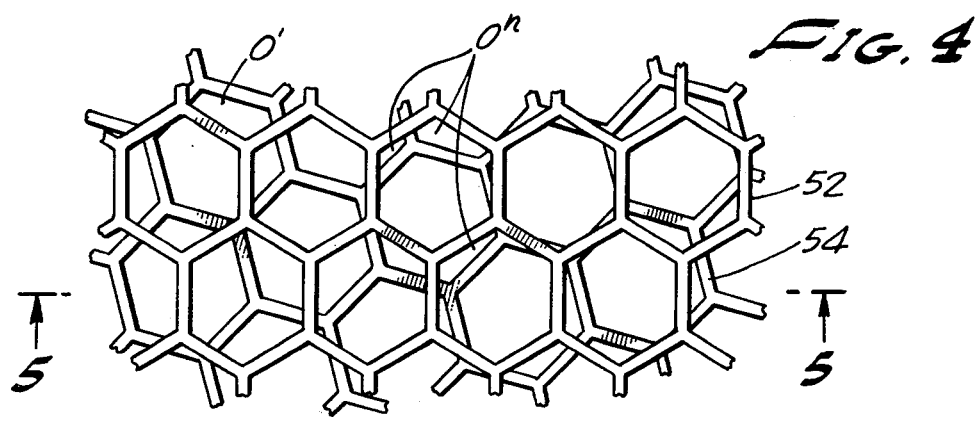
FIG. 4 is a partial section, similar to that of FIG. 2, but showing an alternate embodiment of the invention.
Figure 5:
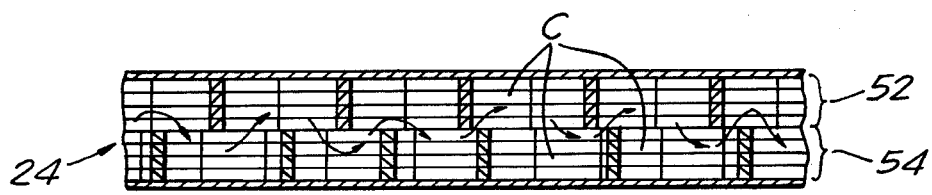
FIG. 5 is a section on the line 5—5 of FIG. 4.

FIG. 4 shows another embodiment of the invention utilizing the same two sets 52, 54 of hexagonally perforated sheet stock. It will be observed that in the case of hexagonally perforated sheet stock, the perforations may be viewed as being equally spaced along three axes spaced 120 degrees apart, i.e., each axis being normal to an opposed pair of the side bars and extending through the center of the hexagonal opening. In FIG. 4 the two sets 52, 54 are offset by rotating one set angularly relative to another within a range of 120 degrees. As is apparent from FIG. 4, the result is a great variety of differently shaped orifices $0'-O^m$ along each radial line of flow of the fluid therethrough, and every radial line of flow within a sector of 120 degrees has a different variety of orificial shapes from that of any other radial line of flow. As is shown in FIG. 5, the result along a line of flow is highly irregular intervals of bars to the flow of fluid which, again, is different for each possible radial line within a sector of 120 degrees. Nevertheless, because of the lateral intercommunication of the many flow paths the fluid exits the suppressor means 24 at a substantially uniform velocity.

Irrespective of the particular manner of offsetting the sets 52, 54, means must be provided for edgewise flow of the fluid into and out of the suppressor means 24. Accordingly, a planform of the two sets 52, 54 should be adopted such that, at opposite sides thereof, peripheral cells C are cut through such as to leave open-sided cells adapted to serve as either an inlet or an outlet to the stack of perforated sheets. Thus, in FIG. 2, along the side of the stack adjacent to the inlet sleeve 56, cells C' have been cut through their walls in order to leave an inlet passage. Similarly, at the other side of the stack, cells C" have been cut through defining an outlet from the stack of perforated sheet stock material.

Figure 6:
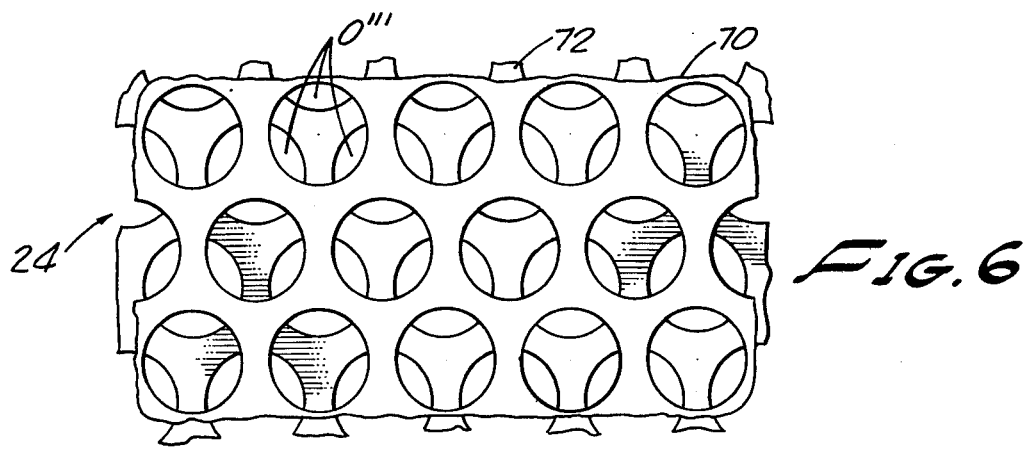
FIG. 6 is a partial plan view of an alternative form of perforated sheet stock for use in the invention.

Another embodiment of suppressor means 24 is schematically shown in FIG. 6. In this case, there are a pair of sheets 70, 72 (or sets thereof) each identically formed with a plurality of circular openings in a staggered relationship. More particularly, in each sheet the circular perforations may be viewed as distributed along two axes x, y, that are obliquely related to another. The underlying sheet 72 is offset laterally, in a direction normal to the axis x, a distance less than a diameter of one of the circular perforations such that each circular perforation has communication with marginal areas of the perforations of the other sheet, defining similar orifices 0'''. In the illustrated case, the sheets 70, 72 have an open area slightly in excess of 50 percent. Accordingly, the two sheets 70, 72 (or sets thereof) may be offset relative to one another within a wide range, otherwise than the specific degree of offset illustrated, in order to define other configurations of orificial openings.

Figure 7:
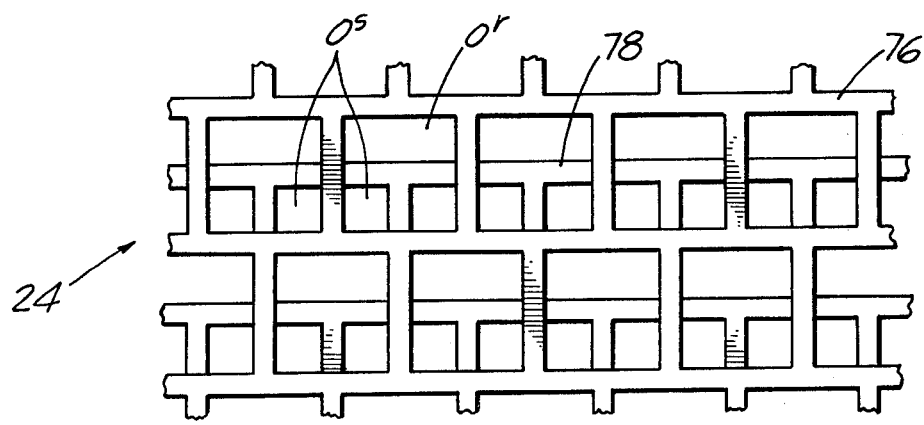
FIG. 7 is a partial plan view of yet another form of perforated sheet stock for use in the invention.

FIG. 7 shows another embodiment of the invention utilizing yet another form of commonly available perforated sheet stock. In this case, there are two sheets 76, 78 (or sets thereof) of sheet stock having square perforations. The two sheets 76, 78 are offset relative to one another substantially half the length of a bar defining the side of a perforation in the direction of a bar. As the sheets 76, 78 have a staggered configuration of rectangular openings, the result in this case is the defining of three orifices in communication with each perforation of a sheet, specifically a rectangular orifice $O^r$ and a pair of square orifices $O^s$. In this case, as in the case of the embodiment of FIG. 6, the sheets should, of course, be cut into a planform such that cells along opposite sides of the sound suppressor means are left open in order to define edgewise inlets and outlets into the stack.

The sheets of perforated stock material may be held together, for example in the sets 52 and/or 54, by mechanical clamping as illustrated in FIG. 1. Alternatively, the sheets of the set 52 and/or set 54 may be brazed together to define a tier, and several tiers may be clamped together, as for example by fastener means 46. Preferably, all of the sheets of a set, e.g., the set 52, should be identical, with all of the sheets having their perforations in precise registration with one another. However, if desired, the sheets of the set, e.g., of set 52, may be staggered in some fashion, as along a helix. It is also possible to utilize several sheets to define a set, e.g., a set 52, in which each sheet of the set has perforations of a pattern dissimilar to sheets of the other set 54, e.g., different hole sizes or different hole spacings.

While the invention has been set forth in detail, it is to be understood that it is not limited in its application to the details of construction and the arrangements of the components set forth in the description or illustrated in the drawings. The invention is capable of other embodiments and of being practiced and carried out in various ways. Also it is to be understood that the phraseology and terminology employed herein is for the purposes of description and should not be regarded as limiting.

We claim:

1. A sound suppressing flow restrictor, of flat form for edgewise conducting therethrough of a pressurized fluid relatively noiselessly to a substantial pressure drop, comprising:

a pair of flat sheets of planar material each having a plurality of perforations of uniform size, each of said sheets having said perforations equally spaced apart along at least two axes;

said pair of sheets being stacked together in an eccentric relationship of their perforations such that each perforation of one sheet overlies a plurality of perforations of the other sheet to define a plurality of orifices through which said perforations have fluid communication with one another;

said stacked pair of sheets having substantially the same planform and being stacked together in registration of their planforms;

said planforms being such that opposite sides of each of said pair of sheets includes randomly arranged open-sided ones of said perforations to define edgewise randomly arranged inlets and randomly arranged outlets in each of said stacked sheets;

a pair of solid barrier plates between which said pair of sheets are stacked, said barrier plates confining flow of a fluid to edgewise passage through said restrictor in the planes of said flat sheets only through said perforations and orifices defined by said perforations; and, said eccentric relationship of said perforations being such that along each line of flow of a fluid between said inlets and said outlets, said line of flow intersects the series of said orifices therealong in a pattern of varying orientations relative to said orifices that is different from that of adjacent lines of flow whereby said sheets adapted for being set in any one of a number of pre-determined eccentric relationships adapted for conducting either non-compressible or compressible fluids between said randomly arranged inlets and said randomly arranged outlets.

2. The flow restrictor of claim 1 wherein:
said pair of sheets both have said perforations of the same uniform size and identically equally spaced apart.

3. The flow restrictor of claim 2 wherein:
said perforations are of hexagonal configuration.

4. The flow restrictor of claim 3 wherein:
said perforations are in a staggered pattern such that an adjacent pair of perforations have a side in common.

5. A flow restrictor as in claim 1 wherein:
said perforations are non-circular in configuration.

6. A flow restrictor as in claim 1 wherein:
said perforations are polygonal in configuration.

7. A sound suppressing flow restrictor for conducting a pressurized fluid relatively noiselessly through a substantial pressure drop, comprising:
a housing having fluid inlet and outlet ports and a fluid passage communicating said ports;
an annular flow restrictor mounted in said passage for conducting a fluid generally radially therethrough from said inlet port to said outlet port;
said restrictor having a plurality of randomly arranged inlets and a plurality of randomly arranged outlets; and,
means in said restrictor comprising a concentrically stacked plurality of flat sheets of a sheet material defining a myriad of generally radially extending and laterally intercommunicating, chambered, tortuous fluid passages through said flow restrictor, said tortuous fluid passages having dissimilarly spaced bars and dissimilarly shaped orifices defined by eccentrically overlapping perforations in said flat sheets of sheet material along different generally radial lines of flow such that each radial line of fluid passage is different from every other radial line of passage within a quadrant of said annular flow restrictor whereby said sheets adapted for being set in any one of a number of pre-determined eccentric relationships adapted for conducting non-compressible or compressible fluids between said randomly arranged inlets and said randomly arranged outlets.

8. A flow restrictor as in claim 7 wherein:
said means comprises two offset sheets of said sheet material that are formed with a plurality of hexagonal perforations.

9. A flow restrictor as in claim 8 wherein:
said two sheets of perforated sheet material have a staggered configuration of said hexagonal perforations.

10. A flow restrictor as in claim 9 wherein:
said two sheets are offset approximately the length of one bar, in the direction of a bar.

11. A flow restrictor as in claim 7 wherein:
said means comprises two offset sets of said sheet material having a plurality of equally spaced apart noncircular perforations.

12. A flow restrictor as in claim 7 wherein:
said means comprises two offset sets of said sheet material having a plurality of equally spaced apart perforations of polygonal configuration.

13. A method of restricting the flow of and inducing a pressure drop in a high pressure fluid, comprising:
providing at least two planar sheets, each of said sheets having a pluraliiy of uniformly distributed perforations;
eccentrically stacking said sheets such that each perforation of one sheet overlies a plurality of perforations of the other sheet to define a plurality of orifices permitting fluid communication, each of said sheets includes randomly arranged opensided ones of said perforations to define edgewise randomly arranged inlets and randomly arranged outlets in each of said sheets;
disposing said attacked sheets between a parallel pair of solid plates for thereby defining a flow restrictor having an inlet communicating with said randomly arranged inlets of said sheets and an outlet communicating with said randomly arranged outlets of said sheets;
flowing the fluid between said parallel pair of solid plates, between said inlet and said outlet;
setting said sheets in a pre-selected one of a number of pre-determined eccentric relationships adapted for conducting non-compressible or compressible fluids between said randomly arranged inlet and said randomly arranged outlets; and,
between said inlet and said outlet, progressively dividing and recombining the fluid through said orifices along chambered flow paths while maintaining lateral fluid communication between the flow paths, repeatedly changing the orientation of said flow paths relative to a series of the orifices along said flow paths such that the progressive dividing and recombining of the fluid through orifices along each chambered flow path is different from that of any other chambered flow path with respect to the pattern of changes in orientation of the flow path relative to the series of orifices therealong.

* * * * *